United States Patent
Xu

(10) Patent No.: US 11,020,954 B2
(45) Date of Patent: Jun. 1, 2021

(54) METHOD OF RESONANT INSPECTION FOR ADDITIVE MANUFACTURING

(71) Applicant: United Technologies Corporation, Farmington, CT (US)

(72) Inventor: JinQuan Xu, East Greenwich, RI (US)

(73) Assignee: Raytheon Technologies Corporation, Farmington, CT (US)

(*) Notice: Subject to any disclaimer, the term of this patent is extended or adjusted under 35 U.S.C. 154(b) by 0 days.

(21) Appl. No.: 16/703,467

(22) Filed: Dec. 4, 2019

(65) Prior Publication Data
US 2020/0108594 A1 Apr. 9, 2020

Related U.S. Application Data

(62) Division of application No. 15/302,785, filed as application No. PCT/US2015/024863 on Apr. 8, 2015, now abandoned.
(Continued)

(51) Int. Cl.
*B33Y 50/02* (2015.01)
*G01N 29/12* (2006.01)
(Continued)

(52) U.S. Cl.
CPC ............... *B33Y 50/02* (2014.12); *B22F 3/24* (2013.01); *B22F 10/00* (2021.01);
(Continued)

(58) Field of Classification Search
CPC ............................... G01H 13/00; G01N 29/12
See application file for complete search history.

(56) References Cited

U.S. PATENT DOCUMENTS

| 5,237,779 A | 8/1993 | Ota |
| 5,351,543 A | 10/1994 | Migliori et al. |

(Continued)

FOREIGN PATENT DOCUMENTS

| DE | 102011113445 A1 | 3/2013 |
| EP | 1815936 A1 | 8/2007 |

(Continued)

OTHER PUBLICATIONS

International Search Report and Written Opinion from PCT Application Serial No. PCT/US2015/024863, dated Jul. 24, 2015, 13 pages.

(Continued)

*Primary Examiner* — Marc C Howell
*Assistant Examiner* — Nicholas J Chidiac
(74) *Attorney, Agent, or Firm* — Kinney & Lange, P.A.

(57) ABSTRACT

A method of additive manufacturing comprises determining a first resonant frequency of an unflawed reference workpiece at a first partial stage of completion, fabricating a production workpiece to the first partial stage of completion via additive manufacture, sensing a second resonant frequency of the production workpiece in-situ at the first partial stage of completion, during the fabrication, analyzing the workpiece for flaws based on comparison of the first and second resonant frequencies, and providing an output indicative of production workpiece condition, based on the analysis.

An additive manufacturing system comprises an additive manufacturing tool, a sensor, and a controller. The additive manufacturing tool is disposed to construct a workpiece via iterative layer deposition. The sensor is disposed to determine a resonant frequency of the workpiece in-situ at the additive manufacturing tool, during fabrication. The con- (Continued)

troller is configured to terminate manufacture of the workpiece if the resonant frequency differs substantially from a reference frequency.

4 Claims, 2 Drawing Sheets

Related U.S. Application Data

(60) Provisional application No. 61/977,801, filed on Apr. 10, 2014.

(51) Int. Cl.

| | | |
|---|---|---|
| *G01N 29/44* | (2006.01) | |
| *G01N 29/04* | (2006.01) | |
| *B33Y 10/00* | (2015.01) | |
| *G01H 13/00* | (2006.01) | |
| *B22F 10/00* | (2021.01) | |
| *B33Y 30/00* | (2015.01) | |
| *B22F 3/24* | (2006.01) | |
| *F01D 5/00* | (2006.01) | |
| *F01D 5/28* | (2006.01) | |
| *B23K 15/00* | (2006.01) | |
| *F01D 5/14* | (2006.01) | |
| *F01D 9/02* | (2006.01) | |
| *F01D 11/08* | (2006.01) | |
| *B22F 10/10* | (2021.01) | |

(52) U.S. Cl.
CPC ...... *B23K 15/0026* (2013.01); *B23K 15/0086* (2013.01); *B33Y 10/00* (2014.12); *B33Y 30/00* (2014.12); *F01D 5/005* (2013.01); *F01D 5/147* (2013.01); *F01D 5/286* (2013.01); *F01D 5/288* (2013.01); *F01D 9/02* (2013.01); *F01D 11/08* (2013.01); *G01H 13/00* (2013.01); *G01N 29/043* (2013.01); *G01N 29/12* (2013.01); *G01N 29/4427* (2013.01); *G01N 29/4436* (2013.01); *B22F 10/10* (2021.01); *B22F 2003/247* (2013.01); *B22F 2999/00* (2013.01); *F05D 2220/32* (2013.01); *F05D 2230/22* (2013.01); *F05D 2230/232* (2013.01); *F05D 2230/234* (2013.01); *F05D 2230/30* (2013.01); *F05D 2230/31* (2013.01); *F05D 2260/96* (2013.01); *Y02P 10/25* (2015.11)

(56) References Cited

U.S. PATENT DOCUMENTS

| | | |
|---|---|---|
| 5,425,272 A | 6/1995 | Rhodes et al. |
| 6,553,275 B1 | 4/2003 | Mazumder |
| 6,580,959 B1 | 6/2003 | Mazumder |
| 8,272,424 B2 | 9/2012 | Short |
| 8,501,075 B2 * | 8/2013 | Philippi ............... G01N 29/12 |
| | | 264/401 |
| 8,570,534 B1 | 10/2013 | Loewgren |
| 2005/0173380 A1 | 8/2005 | Carbone |
| 2005/0173880 A1 | 8/2005 | Carbone |
| 2011/0121492 A1 * | 5/2011 | Philippi ............... G01N 29/12 |
| | | 264/401 |
| 2012/0310576 A1 | 12/2012 | Rose et al. |
| 2013/0088724 A1 | 4/2013 | Dubois et al. |
| 2013/0101728 A1 | 4/2013 | Keremes et al. |

FOREIGN PATENT DOCUMENTS

| | | |
|---|---|---|
| WO | WO2009/144489 A1 | 12/2009 |
| WO | WO2012/097799 A3 | 7/2012 |
| WO | WO-2012097799 A3 * | 10/2012 ............ B22F 3/1055 |
| WO | WO2013/098054 A1 | 7/2013 |

OTHER PUBLICATIONS

D. Sinha, "Acoustic Resonance Spectroscipy (ARS)", from IEEE Potentials, vol. 11, No. 2, 1992, pp. 10-13.
Extended European Search Report for EP Application No. 15776014.1, dated Mar. 29, 2017, 9 pages.
Communication Pursuant to Article 94(3) EPC for EP Application No. 15776014.1, dated May 6, 2020, 4 pages.

* cited by examiner

METHOD OF RESONANT INSPECTION FOR ADDITIVE MANUFACTURING

CROSS-REFERENCE TO RELATED APPLICATION(S)

This application is a divisional of U.S. application Ser. No. 15/302,785, filed Oct. 7, 2016 for "REAL-TIME RESONANT INSPECTION FOR ADDITIVE MANUFACTURING" by JinQuan Xu, which is a 371 of International Application No. PCT/US2015/024863, filed Apr. 8, 2015 for "REAL-TIME RESONANT INSPECTION FOR ADDITIVE MANUFACTURING" by JinQuan Xu, which in turn claims the benefit of U.S. Provisional Application No. 61/977,801, filed Apr. 10, 2014 for "REAL-TIME RESONANT INSPECTION FOR ADDITIVE MANUFACTURING" by JinQuan Xu.

BACKGROUND

The present invention relates generally to additive manufacturing, and more particularly the methods and systems for fabricating gas turbine engine workpieces via additive manufacturing.

Gas turbine engines are internal combustion engines with upstream compressors and downstream turbines fluidly connected through a combustor. Gas turbines operate according to the Brayton cycle, extracting energy from high-pressure, high-temperature airflow downstream of the combustor, where fuel is injected into pressurized airflow from the compressor, and ignited. Many gas turbine engine components guide airflow, either as a working fluid of the engine, or for cooling. Blades and vanes, for instance, are airfoil components with smooth outer surfaces configured to guide working fluid for compression (in a compressor) or energy extraction (in a turbine).

Additive manufacturing is increasingly used to fabricate gas turbine engine workpieces such as blades, vanes, and air seals. Tolerances for these parts are often very fine. Defective parts that fail to meet design specifications can sometimes be reworked or repaired, but must often be discarded, at significant cost.

SUMMARY

In one embodiment, the present invention relates to a method of additive manufacturing. The method comprises determining a first resonant frequency of an unflawed reference workpiece at a first partial stage of completion, fabricating a production workpiece to the first partial stage of completion via additive manufacture, sensing a second resonant frequency of the production workpiece in-situ at the first partial stage of completion, during the fabrication, analyzing the workpiece for flaws based on comparison of the first and second resonant frequencies, and providing an output indicative of production workpiece condition, based on the analysis.

In another embodiment, the present invention relates to an additive manufacturing system comprising an additive manufacturing tool, a sensor, and a controller. The additive manufacturing tool is disposed to construct a workpiece via iterative layer deposition. The sensor is disposed to determine a resonant frequency of the workpiece in-situ at the additive manufacturing tool, during fabrication. The controller is configured to terminate manufacture of the workpiece if the resonant frequency differs substantially from a reference frequency.

Figure 1:
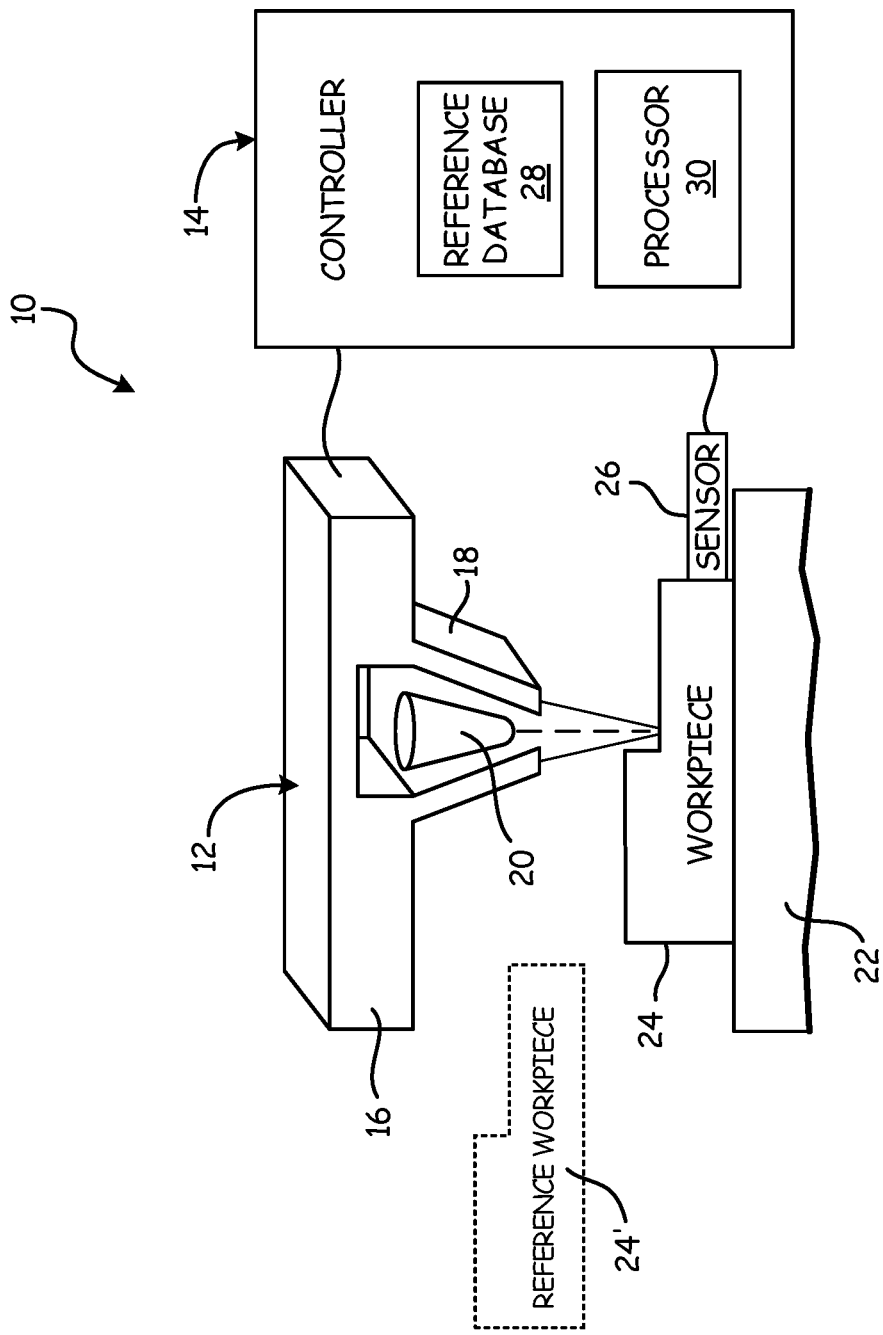
FIG. 1 is a schematic block diagram of an embodiment of an additive manufacturing system.

While the above-identified figures set forth embodiments of the present disclosure, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings.

DETAILED DESCRIPTION

In a variety of applications including gas turbine engine part additive manufacturing, workpieces can develop defects during fabrication. To limit waste, the present invention allows additive manufacturing workpieces to be inspected in-situ during production, in real time. In this way, flawed workpieces can be identified and discarded or set aside for repair immediately, at a partial stage of production. Thus, the present invention avoids devoting additional material and production time to defective workpieces.

FIG. 1 is a schematic diagram of additive manufacturing system 10, which comprises additive manufacturing tool 12 and controller 14. Additive manufacturing tool 12 comprises pulverant material reservoir 16, pulverant dispensers 18, laser guide 20, platform 22 for workpiece 24, and sensor 26. Controller 14 comprises reference database 28 and processor 30. Workpiece 24 is compared to reference workpiece 24', as described in greater detail below.

Additive manufacturing system 10 is a system for the fabrication of workpieces such as gas turbine engine blades, vanes, and air seals via iterative deposition of layers of pulverant material. In the depicted embodiment, additive manufacturing tool 12 is a direct metal laser sintering (DMLS) system. Persons skilled in the art, however, will recognize that the present system and method can utilize alternatively use other additive manufacturing techniques.

Pulverant material reservoir 16 of additive manufacturing tool 12 can be any container suitable for holding pulverant material suitable for use in additive manufacturing, such as fine powders of conductors or insulators. For example, this pulverant material can be superalloy powder, or ceramics powder. Pulverant material dispensers 18 can be opened or closed to selectively restrict flow of pulverant material to workpiece 24 on platform 22. Laser guide 20 is a laser emitter or focusing element that directs a laser to soften, melt or sinter pulverant material deposited by pulverant material dispensers 18. Additive manufacturing tool 12 builds workpiece 24 layer-by-layer by iteratively depositing and sintering pulverant atop platform 22. Platform 22 can, for instance, be a mobile platform configured to position a working region of workpiece 24 beneath laser guide 20. Alternatively, laser guide 20 and/or additive manufacturing tool 12 as a whole can be a movable or directable device capable of adjusting this working region relative to a stationary embodiment of platform 22.

Although additive manufacturing tool 12 is depicted as a DMLS system, a variety of other additive manufacturing tools can alternatively be used, including laser additive manufacturing (LAM) tools (e.g. laser engineered net shaping (LENS), laser powder deposition (LPD), or selective laser sintering (SLS) apparatus) or electron beam machining tools (e.g. electron beam melting (EBM) or electron beam wire (EBW) apparatus). In some embodiments, additive manufacturing tool 12 can incorporate a plurality of additive manufacturing tools 22 (of similar or differing configurations) that operate sequentially or in parallel. All embodiments of additive manufacturing system 10 build workpiece 24 layer-by-layer atop additive manufacturing platform 22.

Controller 14 is a logic-capable device that manages additive manufacturing of workpiece 24, e.g. by controlling the movement platform 22 or pulverant dispensers 18, directing laser guide 20, and metering pulverant material supplied from pulverant material reservoir 16. Controller 14 can, for instance, be a microprocessor incorporated into additive manufacturing tool 12, or a separate user workstation or control computer situated elsewhere. Controller 14 can, for instance, be programmed with a part design describing workpiece 24 in three dimensions. Alternatively, controller 14 can specify the steps to fabricating workpiece 24 and machining workpiece 24 without including a full design of the finished gas turbine component. Although controller 14 is depicted as a single unitary component, some embodiments of additive manufacturing system 10 can use more than one controller 14. In particular, some embodiments of additive manufacturing system 10 can include a plurality of (e.g. parallel) additive manufacturing tools 12, each with associated controller 14.

Controller 14 receives frequency signals from sensor 26 reflecting the resonant frequency of workpiece 24 at increasing stages of its fabrication. Sensor 26 is a resonant frequency sensor directly or indirectly abutting and directly or indirectly physically contacting workpiece 24. Sensor 26 can, for example, be an active sensor disposed to "ping" workpiece 24 and sense resonant frequency from resulting vibration. Sensor 26 can sense resonant frequency periodically, or in response to signal requests from controller 14. Sensor 14 provides controller 14 with real-time values of the resonant frequency of workpiece 24, during fabrication. As described in greater detail below with respect to method 100 of FIG. 2, controller 14 comprises reference database 28 and processor 30. Reference database 28 stores an archive of reference resonant frequencies corresponding to optimal (i.e. unflawed) states of reference workpiece 24', at the various stages of its fabrication. Processor 30 analyzes workpiece 24 for flaws in real time during its fabrication by comparing sensed resonant frequencies from sensor 26 to corresponding reference frequencies from reference database 28. If corresponding sensed and reference frequencies at a given stage of completion differ by more than a threshold value (e.g. 10%), processor 30 provides an output indicating that workpiece is flawed. Controller 14 can then command that (flawed) workpiece 24 be discarded or set aside for repair, so as to not waste further material and assembly time on an unusable part.

Figure 2:
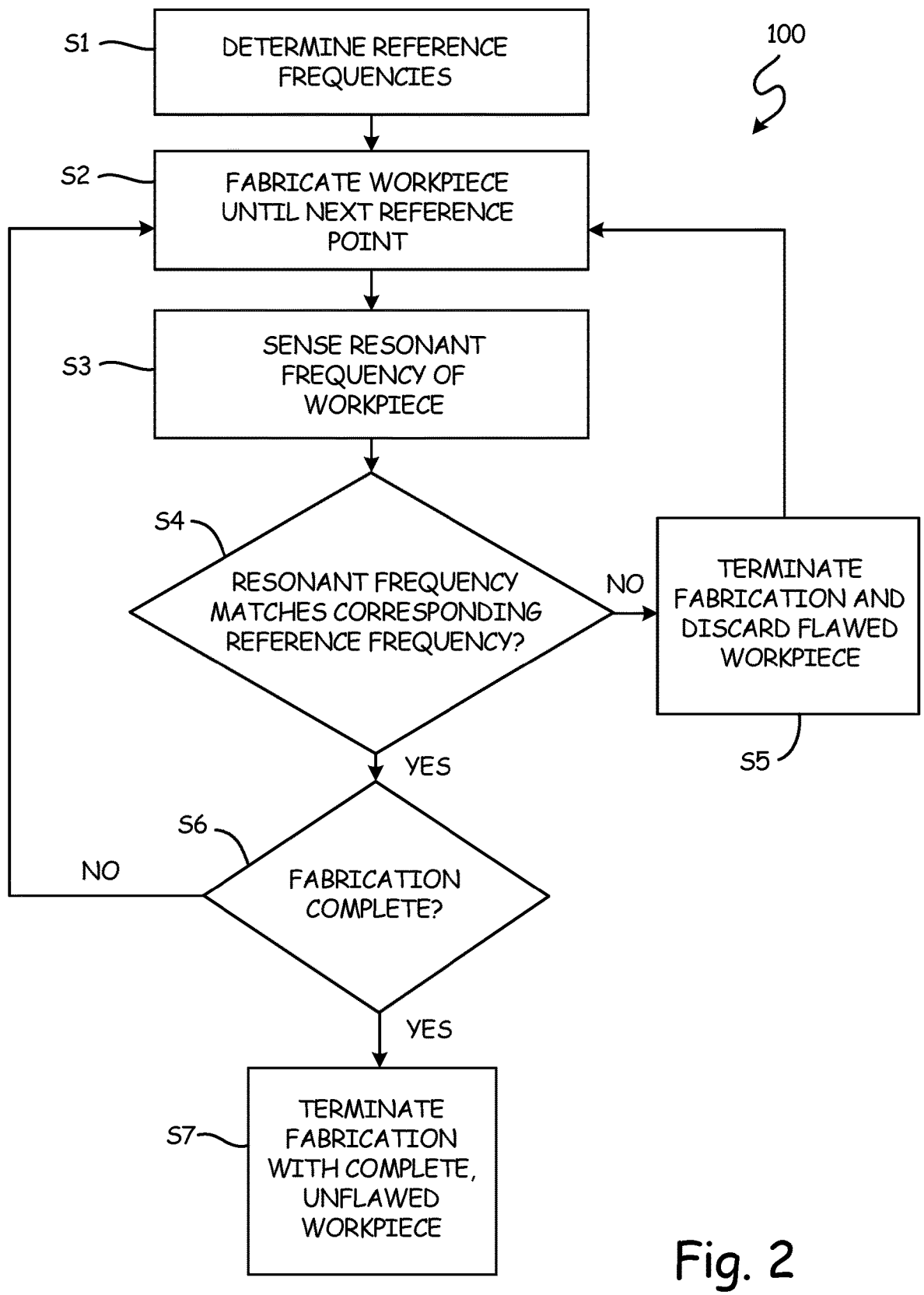
FIG. 2 is a method flowchart of an embodiment of a method of additive manufacturing using the system of FIG. 1.

FIG. 2 is a method flowchart illustrating method 100, one possible embodiment of a method of operation for additive manufacturing system 10. Method 100 is a real-time resonant frequency inspection method whereby the resonant frequency of workpiece 24 is checked against reference frequency values corresponding an unflawed workpiece at successive stages of fabrication, as described above with respect to FIG. 1.

First, reference database 28 is populated with reference frequencies. (Step S1). These reference frequencies can be determined in a variety of ways. In one embodiment, reference frequencies corresponding to each stage of completion of workpiece 24 are determined by fabricating a physical reference workpiece 24' to that stage of completion, independently verifying that reference workpiece 24' is unflawed (e.g. by physical testing, inspection, or imaging), and sensing its reference frequency. In another embodiment, reference frequencies corresponding to each stage of completion of workpiece 24 are determined by fabricating a complete physical reference workpiece 24', independently verifying that reference workpiece 24' is unflawed, and successively machining away material from reference workpiece 24' until the reference workpiece 24' is reduced to each partial stage of completion. At each stage of completion, the resonant frequency of reference workpiece 24' is sensed to populate reference database 28. In yet another embodiment, reference frequencies corresponding to each stage of completion of workpiece 24 are determined by computing resonant frequencies of a simulated reference workpiece 24', e.g. using a computer model. For greater precision, any of these methods can be repeated to produce a range or average value of optimal or acceptable workpiece resonant frequencies, at each stage of completion. In some cases, two or more methods can be used to independently produce reference frequencies that are compared to ensure reliability.

Once reference database 28 has been populated with reference frequencies using any or all of the methods described above, additive manufacture tool 12 can begin fabrication of workpiece 24. Additive manufacture tool 12 fabricates workpiece 24 up to a reference point corresponding to a stage of completion for which reference database 28 holds a corresponding reference frequency. (Step S2). This reference point can, for example, be a step in a digital map describing the fabrication process of workpiece 24, a number of layers deposited, or a thickness or size of workpiece 24 fabricated thus-far or another suitable step, parameter, or characteristic. Sensor 26 senses a resonant frequency of workpiece 24 at this stage of completion, and transmits the sensed frequency to controller 14. (Step S3). Processor 30 compares the sensed frequency to a corresponding reference frequency stored in reference database 28. (Step S4). If the sensed frequency fails to match the corresponding reference frequency, controller 14 provides an output indicating that workpiece 24 is flawed, and instructs additive manufacturing tool 12 to terminate fabrication and discard or set aside the flawed workpiece. (Step S5). If the sensed frequency falls within an acceptable range of the corresponding reference frequency (e.g. ±10%), processor 30 determines whether fabrication of workpiece 24 is complete. (Step S6). If not, fabrication continues from Step S2. When workpiece 24 is complete, method 100 terminates, and additive manufacturing system 10 releases complete, unflawed workpiece 24. (Step S7). When fabrication terminates due to completion or flaw detection, additive manufacturing system 10 can reset, beginning fabrication of a new workpiece (Step S2). Step S1 need not be repeated for each new workpiece.

Additive manufacturing system 10 and method 100 allow for waste to be reduced or minimized while fabricating workpiece 24. Rather than spending additional manufacturing time depositing further layers of pulverant material on a flawed workpiece, method 100 allows additive manufacturing system 10 to recognize flaws and prematurely terminate production of the flawed workpiece, thereby preventing waste. Additive manufacturing system 10 and method 100 also serve as additional quality control checks, ensuring that workpieces 24 meet design specifications.

Discussion of Possible Embodiments

The following are non-exclusive descriptions of possible embodiments of the present invention.

A method of additive manufacturing comprises: determining a first resonant frequency of an unflawed reference workpiece at a first partial stage of completion; fabricating a production workpiece to the first partial stage of completion via additive manufacture; sensing a second resonant frequency of the production workpiece in-situ at the first partial stage of completion, during the fabricating; analyzing the workpiece for flaws based on comparison of the first and second resonant frequencies; and providing an output indicative of production workpiece condition, based on the analysis.

The method of the preceding paragraph can optionally include, additionally and/or alternatively, any one or more of the following features, configurations and/or additional components:

A further embodiment of the foregoing method, further comprising prematurely terminating fabrication of the production in response to substantial deviation of the second resonant frequency from the first resonant frequency.

A further embodiment of the foregoing method, wherein the first resonant frequency differs substantially from the second resonant frequency if the first and second resonant frequencies differ by 10% or more.

A further embodiment of the foregoing method, wherein determining the first resonant frequency comprises sensing the resonant frequency of a workpiece independently verified as unflawed, at the first partial stage of completion A further embodiment of the foregoing method, wherein determining the first resonant frequency comprises: completely fabricating the unflawed reference workpiece; machining away material from the unflawed reference workpiece until the unflawed reference workpiece is reduced to the first partial stage of completion; and acoustically sensing a resonant frequency of the unflawed reference workpiece.

A further embodiment of the foregoing method, wherein determining the first resonant frequency comprises simulating the unflawed reference workpiece, and computing a resonant frequency of the simulated unflawed reference workpiece.

A further embodiment of the foregoing method, further comprising: determining at least a third resonant frequency of the unflawed reference workpiece at a second partial stage of completion distinct from the first stage of completion; sensing at least a fourth resonant frequency of the production workpiece in-situ at the second partial stage of completion; and analyzing the workpiece for flaws based on comparison of at least the third and fourth resonant frequencies.

An additive manufacturing system comprises: an additive manufacturing tool disposed to construct a workpiece via iterative layer deposition; a sensor disposed to determine a resonant frequency of the workpiece in-situ at the additive manufacturing tool, during fabrication; and a controller configured to terminate manufacture of the workpiece if the resonant frequency differs substantially from a reference frequency.

The additive manufacturing system of the preceding paragraph can optionally include, additionally and/or alternatively, any one or more of the following features, configurations and/or additional components:

A further embodiment of the foregoing additive manufacturing system, wherein the additive manufacturing tool comprises an electron beam machining apparatus.

A further embodiment of the foregoing additive manufacturing system, wherein the additive manufacturing tool comprises a direct metal laser sintering apparatus.

A further embodiment of the foregoing additive manufacturing system, wherein the sensor is disposed to periodically determine the resonant frequency at multiple stages of completion of the workpiece, and the controller is configured to terminate manufacture of the workpiece if at any time the resonant frequency differs substantially from a corresponding reference frequency.

A further embodiment of the foregoing additive manufacturing system, wherein the controller comprises a processor and a database containing a plurality of reference frequencies.

A further embodiment of the foregoing additive manufacturing system, wherein the sensor is an active sensor disposed to both induce and sense vibration in the workpiece.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method of additive manufacturing comprises:
   determining a first resonant frequency of an unflawed reference workpiece at a first partial stage of completion, wherein determining the first resonant frequency comprises:
   completely fabricating the unflawed reference workpiece;
   machining away material from the unflawed reference workpiece until the unflawed reference workpiece is reduced to the first partial stage of completion; and
   acoustically sensing a resonant frequency of the unflawed reference workpiece;
   fabricating a production workpiece to the first partial stage of completion via additive manufacture;
   sensing a second resonant frequency of the production workpiece in-situ at the first partial stage of completion, during the fabricating;
   analyzing the workpiece for flaws based on comparison of the first and second resonant frequencies; and
   providing an output indicative of production workpiece condition, based on the analysis.

2. The method of claim 1, further comprising:
   prematurely terminating fabrication of the production in response to substantial deviation of the second resonant frequency from the first resonant frequency.

3. The method of claim 2, wherein the first resonant frequency differs substantially from the second resonant frequency if the first and second resonant frequencies differ by 10% or more.

4. The method of claim 1, further comprising:
determining at least a third resonant frequency of the unflawed reference workpiece at a second partial stage of completion distinct from the first stage of completion;
sensing at least a fourth resonant frequency of the production workpiece in-situ at the second partial stage of completion; and
analyzing the workpiece for flaws based on comparison of at least the third and fourth resonant frequencies.

* * * * *